United States Patent [19]
Hashida

[11] Patent Number: 5,911,484
[45] Date of Patent: Jun. 15, 1999

[54] AUTOMATIC BRAKE FLUID PRESSURE CONTROL DEVICE

[75] Inventor: Koichi Hashida, Itami, Japan

[73] Assignee: Sumimoto Electric Industries, Ltd., Osaka, Japan

[21] Appl. No.: 08/899,720

[22] Filed: Jul. 24, 1997

[30] Foreign Application Priority Data

Jul. 26, 1996 [JP] Japan ................................ 8-197896

[51] Int. Cl.$^6$ ............................................ B60T 8/42
[52] U.S. Cl. .................................. 303/115.4; 303/113.2; 303/116.2
[58] Field of Search ............................ 303/115.4, 116.1, 303/116.2, 113.2, 113.3, 114.1; 188/358

[56] References Cited

U.S. PATENT DOCUMENTS

| | | | |
|---|---|---|---|
| 4,050,748 | 9/1977 | Balart | 303/114 |
| 4,428,623 | 1/1984 | Bertling et al. | 303/114.3 |
| 5,249,854 | 10/1993 | Yamada | 303/115.4 |

FOREIGN PATENT DOCUMENTS

| | | | |
|---|---|---|---|
| 0 426 513 A1 | 5/1991 | European Pat. Off. | |
| 3740690 | 6/1989 | Germany | 303/115.4 |
| 5-65388 | 3/1989 | Japan . | |
| 4-231241 | 8/1992 | Japan . | |
| 5-116607 | 5/1993 | Japan . | |

OTHER PUBLICATIONS

Patent Abstracts of Japan, Publication No. 01074153A, "Wheel Brake Control", Date of Publication –Mar. 20, 1989.

*Primary Examiner*—Peter M. Poon
*Assistant Examiner*—Hargobind S. Sawhney
*Attorney, Agent, or Firm*—Wenderoth, Lind & Ponack, L.L.P.

[57] ABSTRACT

If the pump for antilock fluid pressure control is used as a fluid pressure source for automatic brake control, the pressure rising speed will drop, deteriorating the responsiveness of the device, or otherwise an extremely large pump-driving motor has to be used. To solve this problem, a fluid supply amplifier and a pressure-responsive valve are provided parallel to each other between a pump and a wheel brake fluid pressure control valve. A solenoid valve is closed until the output fluid pressure rises to a predetermined value to amplify the amount of fluid discharged from the pump with the fluid supply amplifier. It is thus possible to increase pressure sufficiently quickly. At the same time, it is possible to increase the output of the pump-driving motor. When the output fluid pressure exceeds the predetermined value, the pressure-responsive valve opens, so that brake fluid is now supplied directly from the pump into the wheel brake. The brake pressure can thus be increased to a high level.

7 Claims, 3 Drawing Sheets

AUTOMATIC BRAKE FLUID PRESSURE CONTROL DEVICE

BACKGROUND OF THE INVENTION

This invention relates to a brake fluid pressure control device which can perform both antilock brake control and automatic brake control such as traction control. The device is basically an antilock brake control system with extra elements added to perform automatic braking control.

Currently, most widely used antilock fluid pressure control devices are those including an electromagnetically driven wheel brake fluid pressure control valve with a discharge valve provided in a main fluid line connecting the master cylinder to each wheel brake, a fluid reservoir for temporarily storing brake fluid discharged through the discharge valve, and a motor-driven pump for sucking and returning the fluid in the reservoir into the main fluid line (hereinafter referred to as fluid-return type antilock control device), because they are economical.

The most economical way to add automatic brake control functions such as traction control function to the fluid-return type antilock control device would be to use the pump for antilock fluid pressure control as a fluid pressure source for automatic brake control by modifying the brake line so that brake fluid can be supplied from the pump to each wheel brake. Devices of this type are already known.

For example, examined Japanese patent publication 5-65388 discloses a device having a valve for connecting a fluid supply circuit to the main circuit only during traction control and otherwise disconnect from the main circuit.

Unexamined Japanese patent publication 4-231241 discloses a device having a second reservoir having a driving means and used as an active pressure accumulator.

Unexamined Japanese patent publication 5-116607 discloses a device having a second reservoir which, having no driving means, is used as a passive pressure accumulator.

If the pump for antilock fluid pressure control is used as a fluid pressure source during automatic brake control, the pressure rising speed will drop, deteriorating the responsiveness of the device, or otherwise an extremely large pump-driving motor has to be used.

This is because the wheel brake is low in rigidity while the pressure is low and due to the output characteristics of the motor. The revolving speed of the motor increases linearly with an increase in the torque loaded. In the low-load region, its output is low. The characteristics of the motor and the pump should be such that a maximum pressure is produced when the motor output is maximum. But in this case, the amount of fluid discharged from the pump in the low-load region will be only twice the amount of fluid discharged when the maximum pressure is produced, due to the characteristics of the motor. Since the wheel brake is low in rigidity in the low-pressure region, a long time is taken in this region. The pressure rising speed may be thus insufficient according to the object of automatic braking. It is of course possible to increase the pressure rising speed by using a large-output motor. But even such a motor can produce only an output that is far smaller than its maximum output in the low-pressure region. In the high-pressure region, the output tends to be rather excessive, which is a waste of energy. That is, using a large-output motor will merely result in increases in size and cost.

An object of this invention is to provide a device which can increase the pressure at a higher rate to a higher level without using a large motor while keeping high efficiency in the low-load region by adding a minimum number of elements.

SUMMARY OF THE INVENTION

According to this invention, there is provided a brake fluid pressure control device having an automatic brake function comprising a fluid-return type antilock control device provided between a master cylinder and a wheel brake. As automatic brake control elements, a first valve means connects the master cylinder to an inlet port of the pump, a second valve means checks fluid flow from the pump to the master cylinder, and a first relief valve for releasing brake fluid into the master cylinder when the fluid pressure in the line between the second valve means and the wheel brake fluid pressure control valve exceeds a predetermined value.

The brake fluid pressure control device further comprises a normally open on-off valve provided between the master cylinder and the wheel brake fluid pressure control valve, and a fluid supply amplifier and a pressure-responsive valve provided parallel to each other between the discharge port of the pump and the wheel brake fluid pressure control valve. Brake-fluid is thereby fed in an amount amplified at a predetermined rate to the wheel brake in the low-pressure region, and in the high-pressure region, the pressure-responsive valve opens, feeding the fluid discharged from the pump directly into the wheel brake.

The fluid supply amplifier comprises an input chamber, an output chamber, and an adjusting chamber and a stepped piston having a first pressure-receiving surface facing the input chamber, a second pressure-receiving surface facing the adjusting chamber, and a third pressure-receiving surface having an area equal to the sum of the areas of the first and second pressure-receiving surfaces and facing the output chamber. A biasing means biasing the stepped piston toward the input chamber, the input chamber being connected to the discharge port of the pump, and the output chamber being connected to a line connecting the on-off valve to the wheel brake fluid pressure control valve.

The control device further comprises a first check valve provided between the adjusting chamber and the master cylinder for allowing only fluid flow from the master cylinder toward the adjusting chamber, and a second check valve provided between the adjusting chamber and the output chamber for allowing only fluid flow from the adjusting chamber to the output chamber.

The pressure-responsive valve receives the fluid pressure from the output chamber in a valve opening direction and receives the fluid pressure from the master cylinder and a spring force in a valve closing direction and is adapted to connect the discharge port of the pump to the wheel brake fluid pressure control valve when the fluid pressure in the output chamber exceeds a predetermined value.

The first valve means may comprise a second fluid reservoir having a fluid chamber communicating with the discharge port of the pump, a piston for changing the volume of the fluid chamber, and a valve body adapted to close the line connecting the master cylinder to the fluid chamber when the piston is at a position where the volume of the fluid chamber is maximum. When the piston is moved from this position to a volume-reducing direction, the piston pushes open the valve body. The second fluid reservoir and a solenoid valve may be provided parallel to each other between the master cylinder and the inlet port of the pump.

For higher reliability, the brake fluid pressure control device may be further provided with a second relief valve provided between the input chamber and the output chamber for connecting the input chamber to the output chamber when the fluid pressure in the input chamber exceeds the fluid pressure in the output chamber by a predetermined value.

The on-off valve may be a solenoid valve or a stroke-responsive valve having a valve body and a valve seat and adapted to open with its valve body separate from its valve seat when the stepped piston is at a stroke end near the input chamber and otherwise closed with its valve body in contact with the valve seat.

To further improve reliability of operation, the brake fluid pressure control device may be further provided with a third relief valve for releasing brake fluid in the adjusting chamber into the master cylinder when the fluid pressure in the adjusting chamber exceeds the fluid pressure in the output chamber by a predetermined value.

According to this invention, in the low-pressure region, the fluid supply amplifier amplifies the amount of fluid supplied, so that a relatively large amount of brake fluid is fed into the wheel brake. In the high-pressure region, the pressure-responsive valve opens, thus feeding the fluid discharged from the pump directly into the wheel brake. Since the fluid amplifier is activated by the fluid discharged from the pump in the low-pressure region, a relatively large load is applied to the pump-driving motor. The motor output is thus kept high even in the low-pressure region. In the high-pressure region, pressure loss is kept minimum because fluid is fed directly from the pump into the wheel brake. Thus, it is possible to increase pressure quickly in the low-pressure region without using not so large-output motor, and to increase pressure to a high level in the high-pressure region.

In the arrangement in which the second fluid reservoir is used as the first valve means, or in the arrangement in which the second fluid reservoir and the first valve means are provided parallel to each other, brake fluid is supplied from the second fluid reservoir during automatic brake control with the brake pedal not depressed (and thus no fluid pressure is produced in the master cylinder). This reduces the pump suction resistance. By providing the second relief valve, it is possible to prevent difficulties that may otherwise be experienced when the stepped piston of the fluid supply amplifier is moved to the stroke end with the pressure-responsive valve closed. Other functions and operations of the second relief valve, stroke-responsive on-off valve and third relief valve will be apparent from the following description of embodiments.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
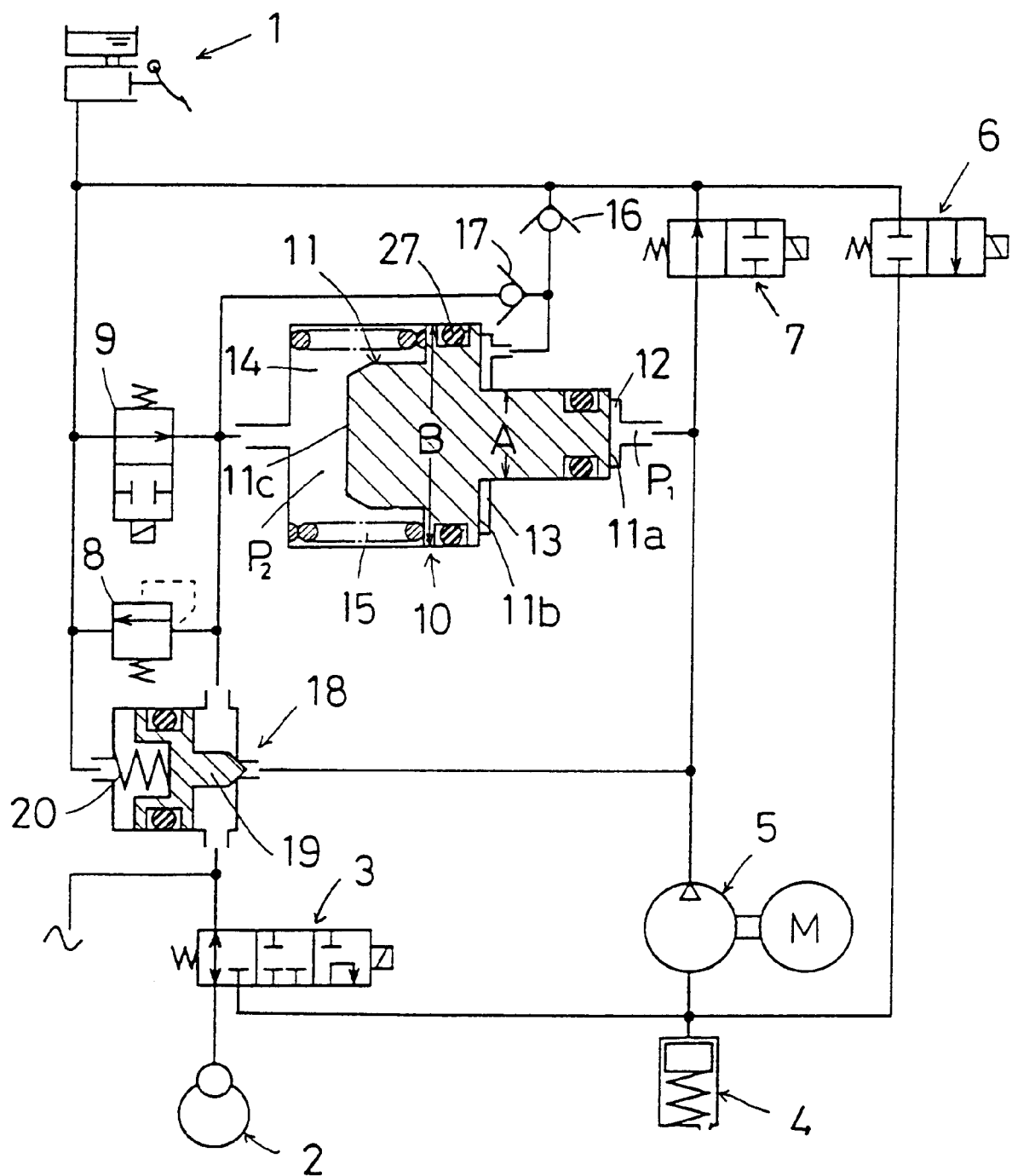
FIG. 1 is a circuit diagram of a brake fluid pressure control device having an automatic brake function of a first embodiment.

FIG. 1 shows a first embodiment of an automatic brake device according to this invention. For simplicity, FIG. 1 shows only the line from the master cylinder to one vehicle wheel.

Shown in FIG. 1 are a master cylinder 1, a wheel brake 2, an electromagnetically driven wheel brake pressure control valve 3, a first fluid reservoir 4 and a motor-driven pump 5. The elements 3–5 constitute a conventional fluid-return type antilock brake control system. Instead of the wheel brake fluid pressure control valve 3 shown, two independent solenoid valves may be used, one for introducing brake fluid into the wheel brake 2 and the other for discharging fluid therefrom.

Also shown in FIG. 1 are a normally closed first valve means 6 (illustrated in the figure is a solenoid valve) that opens during traction control to allow the pump 5 to draw brake fluid from the master cylinder 1, a normally open second valve means 7 (illustrated in the figure is a solenoid valve) that closes during traction control to stop the fluid discharged from the pump 5 from returning to the master cylinder 1, and a first relief valve 8 for returning any excess fluid to the master cylinder. These elements 6–8 provide the fluid-return type antilock control system with the traction control function. The structure thus far described belongs to prior art.

The system shown further includes a normally open solenoid valve 9 as an on-off valve, a fluid supply amplifier 10, a first check valve 16, a second check valve 17, and a pressure-responsive valve 18. These are elements newly added according to this invention.

The solenoid valve 9 is provided in the line extending between the master cylinder 1 and the wheel brake 2.

The fluid supply amplifier 10 comprises a stepped piston 11 liquid-tightly and slidably received in a stepped bore and having a first pressure-receiving surface 11a facing an input chamber 12, a second pressure-receiving surface 11b facing an adjusting chamber 13, and a third pressure-receiving surface 11c facing an output chamber 14. The difference in area between the first and third pressure-receiving surfaces 11a and 11c is provided by the adjusting chamber 13. The stepped piston 11 is biased by a spring 15 toward the input chamber 12. The input chamber 12 communicates with the discharge end of the pump 5, while the output chamber 14 communicates with the line extending from the solenoid valve 9 to the wheel brake fluid pressure control valve 3.

The first check valve 16 is provided in the line between the adjusting chamber 13 and the master cylinder 1 to permit only fluid flow from the master cylinder 1 toward the adjusting chamber 13. The second check valve 17 is provided in the line connecting the adjusting chamber 13 to the output chamber 14 to permit only fluid flow from the adjusting chamber 13 to the output chamber 14.

The pressure-responsive valve 18 comprises a piston 19 having a valve body, and a spring 20 biasing the piston 19 toward a closed position, i.e. the position in which the valve body is pressed against a valve seat. The pressure of the master cylinder 1 acts on the piston 19 to urge it toward the closed position, while the fluid pressure from the output chamber 14 acts on the piston 19 to urge it toward an open position, i.e. the position in which the valve body separates from the valve seat. The pressure-responsive valve 18 is provided in a line extending from the pump 5 to the wheel brake fluid pressure control valve 3, in parallel to the line in which the fluid supply amplifier 10 is provided.

Now the operation of the embodiment of FIG. 1 is described.

During normal braking or antilock brake control, the valve means 6 is closed, while the valve means 7 and the solenoid valve 9 are kept open. In this state, the input and output chambers 12 and 14 of the fluid supply amplifier 10 communicate with each other, so that the stepped piston 11, biased by the spring 15, is kept pushed against the end wall of the output chamber 14 near the input chamber 12 (as shown in FIG. 1). Thus, the brake system can perform antilock brake control and normal braking control in exactly the same manner as a conventional brake system. That is, in this state, the brake fluid from the master cylinder 1 flows directly toward the wheel brake 2.

When the controller (not shown) produces a pressure reduction signal for antilock control, the brake fluid in the wheel brake 2 is discharged by the wheel brake fluid pressure control valve 3 into the fluid reservoir 4. The discharged fluid is then suction up by the pump 5 and returned through the valve means 7 into the line extending from the master cylinder 1 to the wheel brake fluid pressure control valve 3. The fluid returned is used to reincrease the brake pressure during antilock control.

During automatic braking, the pump 5 is activated with the valve means 6 opened and the valve means 7 and the solenoid valve 9 closed. The pump 5 thus sucks brake fluid from the master cylinder 1 through the valve means 6. Since the valve means 7 and the pressure-responsive valve 18 are closed in this state, fluid discharged from the pump 5 flows into the input chamber 12 of the fluid supply amplifier 10, thus moving the stepped piston 11 leftwardly in FIG. 1. Since the solenoid valve 9 is closed in this state, fluid discharged from the output chamber 14 by the piston 11 flows through the wheel brake fluid pressure control valve 3 into the wheel brake 2. In this state, the adjusting chamber 13 is under negative pressure, so that brake fluid in the master cylinder flows through the check valve 16 into the chamber 13.

Now suppose the first pressure-receiving surface 11a has an area A and the third pressure-receiving surface 11c has an area B. Then, the amount of fluid discharged from the output chamber 14 into the wheel brake 2 will be amplified by B/A times as great as the amount of fluid discharged from the pump 5. Thus, it is possible to increase the brake pressure more quickly than if fluid discharged from the pump is directly introduced into the wheel brake. Also, if the force of the spring 15 and the slide resistance of the piston are ignored, the input fluid pressure P1 will be B/A times as great as the output pressure P2. Thus, even at the low-pressure region, the pump-driving motor is put under a relatively large load, so that the output of the motor is always kept high.

When the stepped piston 11 is pushed leftwardly of FIG. 1 and the output pressure P2 increases to a predetermined point, the piston 19 of the pressure-responsive valve 18 will be moved by the output pressure P2 to its open position against the valve closing force of the spring 20. (In this state, i.e. during automatic braking control, no valve closing pressure is supplied from the master cylinder.)

When the valve 18 opens, the input chamber 12 communicates with the output chamber 14, so that the input pressure P1 drops and the output pressure P2 rises until they become equal to each other. Since P1/P2 is now smaller than B/A, the stepped piston 11 stops, so that the fluid discharged from the pump 5 begins to flow into the wheel brake 2 through the pressure-responsive valve 18. Also, when the piston urging force by the output pressure P2 plus the force of the spring 15 becomes greater than the counteracting piston urging force by the input pressure P1, the stepped piston 11 begins to move rightwardly of FIG. 1, increasing the fluid pressure in the adjusting chamber 13 to a level higher than the output pressure P2. This opens the second check valve 17. Brake fluid in the adjusting chamber 13 thus begins to flow through the check valve 17 into the output chamber 14, allowing the stepped piston 11 to move rightwardly of FIG. 1 to its original position.

The amount of fluid flowing into the output chamber 14 by the time the stepped piston 11 returns to its original position is equal to the amount of fluid discharged from the adjusting chamber 13 and the input chamber 12 into the output chamber 14. Thus, the return movement of the stepped piston 11 will have no influence on the supply of brake fluid to the wheel brake 2. That is, the fluid discharged from the pump 5 is 100% supplied to the wheel brake 2 with no loss and used for braking without being wasted. It is thus possible to increase the brake pressure to a high level.

Figure 2:
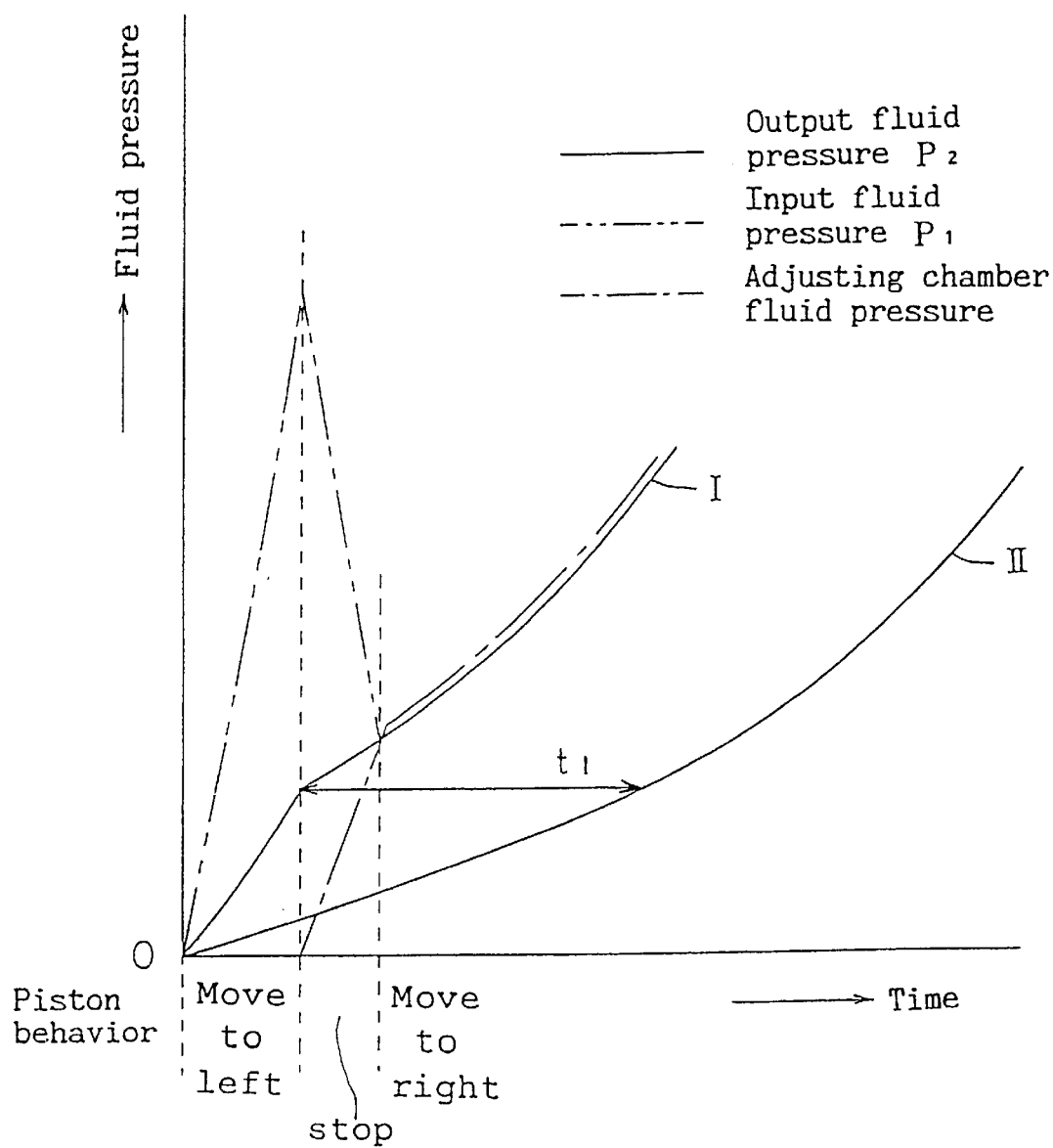
FIG. 2 is a graph showing pressure rising speeds when the device of FIG. 1 is used and when not used.

The graph of FIG. 2 illustrates how the brake pressure increases.

The curve I in FIG. 2 indicates the output fluid pressure increase curve when the amount of fluid supplied to the wheel brake is amplified until the pressure rises to a predetermined level. The curve II indicates a pressure increase curve when the amount of fluid is not amplified. As will be apparent from this figure, by using the fluid pressure control device according to this invention, it is possible to shorten the time necessary for pressure increase by t1 (if the pump and the motor are the same).

The illustrated device makes it possible to control the fluid pressure of the wheel brake 2 to any level not exceeding the output fluid pressure P2 while the output pressure P2 is rising as shown in FIG. 2 by changing the position of the wheel brake fluid pressure control valve 3 according to the vehicle and wheel behaviors. For example, it is possible to reincrease the pressure of the wheel brake 2 quickly to a desired level immediately by action of the fluid supply amplifier 10 after the wheel brake pressure has been increased and then reduced, because the stepped piston 11 automatically returns to its original position as soon as the pressure-responsive valve 18 opens.

When the fluid pressure P2 has increased to the relief pressure of the first relief valve 8, the valve 8 opens to release the fluid discharged from the pump into the master cylinder 1, thus preventing possible breakage of the device due to abnormal pressure buildup.

When the automatic brake control ends, the controller closes the valve means 6, opens the valve means 7 and the solenoid valve 9, and deactivates the pump 5. The stepped piston 11 is thus pushed rightwardly of the figure by the spring 15 to its original position.

Figure 3:
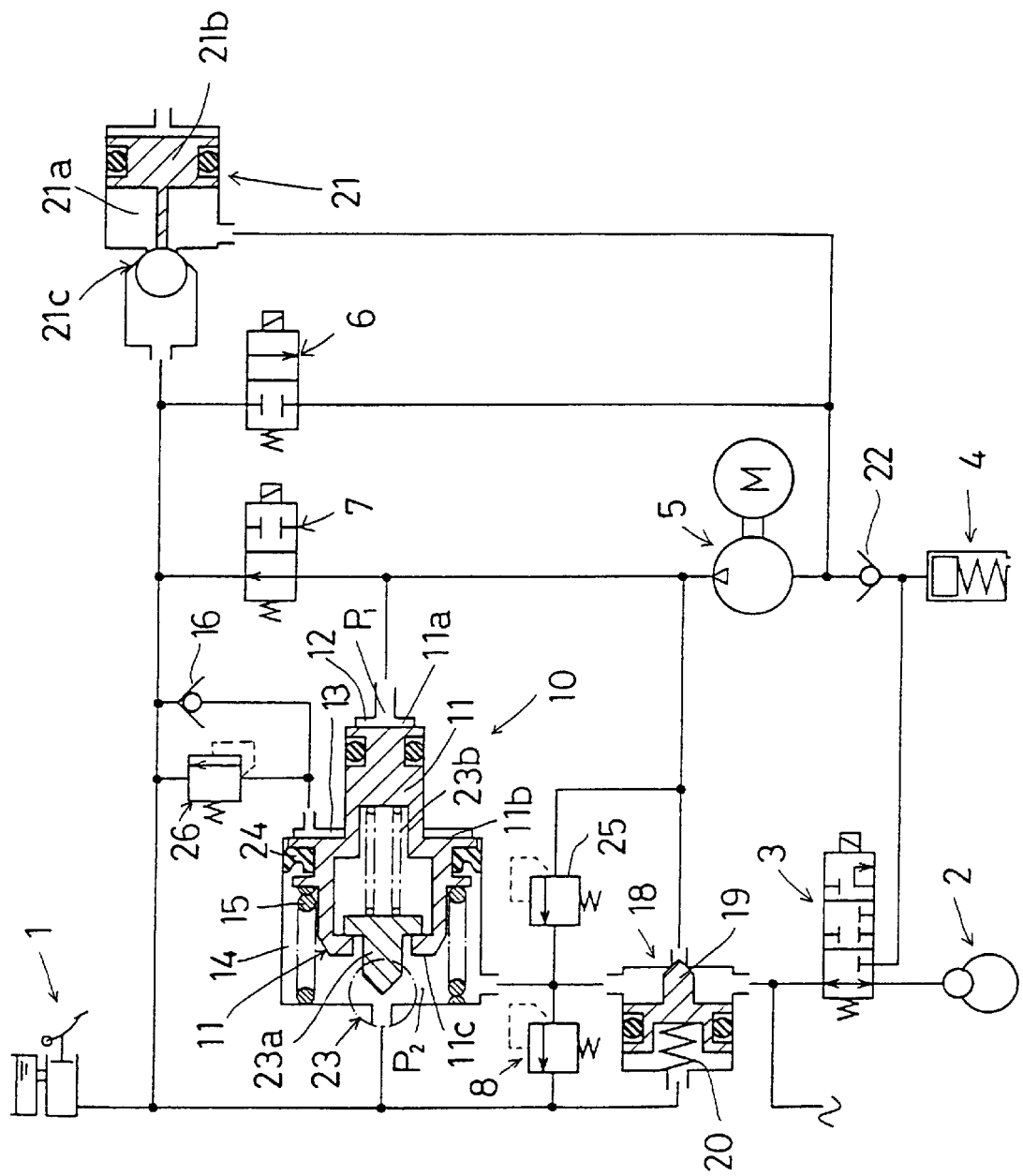
FIG. 3 is a circuit diagram of a device of a second embodiment.

FIG. 3 shows a fluid pressure control device of the second embodiment. Like FIG. 1, this figure also shows only the line extending from the master cylinder to one vehicle wheel.

Many of the elements in the device shown in FIG. 3 are the same as those in the device of FIG. 1. These elements are denoted by the same numerals and their description is omitted. Here, only what differs from the embodiment of FIG. 1 is described.

Numeral 21 indicates a second fluid reservoir optionally provided between the master cylinder 1 and the inlet port of the pump 5 in parallel to the first valve means 6 so that the pump 5 can easily suction up brake fluid while automatic brake control is being carried out with the brake pedal not depressed.

The second fluid reservoir 21 comprises a fluid chamber 21a communicating with the inlet port of the pump 5, a piston 21b for changing the volume of the fluid chamber 21a, and a valve body 21c adapted to close the line connecting the master cylinder 1 to the fluid chamber 21a when the piston 21b is at a position where the volume of the fluid chamber 21a is maximum. When the piston 21b is moved from this position to reduce the volume of the chamber 21a, it pushes open the valve body 21c. In the FIG. 3 embodiment, brake fluid discharged through the first relief valve 8 mostly returns to the master cylinder 1. But this relief valve 8 may be arranged such that brake fluid is returned through the valve 8 into the fluid chamber 21a of the second fluid reservoir 21. If automatic brake control is unnecessary while the brake pedal is being depressed, the first valve means 6 may be omitted because the second fluid reservoir 21 can be used as the first valve means.

Numeral 22 indicates a check valve for stopping brake fluid from flowing from the master cylinder 1 into the first fluid reservoir 4 when automatic braking control starts while the brake pedal is being operated.

The second fluid reservoir 21 and the check valve 22 are disclosed in Japanese patent applications 6-246400 and 8-75763, respectively, and are not important elements for this invention. Thus, their detailed description is omitted. The second fluid reservoir 21 functions as an auxiliary brake fluid source when brake fluid is drawn into the adjusting chamber 13 via the check valve 16.

Numeral 23 indicates a stroke-responsive valve used in place of the solenoid valve 9 of FIG. 1. This valve is what is known as a center valve used widely e.g. for master cylinders. In this embodiment, the valve 23 is mounted in the stepped piston 11 with its valve body 23a biased by its spring 23b. As soon as the stepped piston 11 begins moving toward the output chamber 14, the valve body 23a comes into contact with the valve seat, closing the fluid line between the master cylinder 1 to the wheel brake fluid pressure control valve 3.

When the fluid supply amplifier 10 is activated and the stepped piston 11 is moving toward the output chamber 14, it is necessary to close the line connecting the master cylinder 1 to the output chamber 14. Once the stepped piston 11 moves toward the output chamber 14 until it separates from the valve body 23a, the fluid pressure in the output chamber 14 and the force of the spring 23b act on the valve body 23a as a valve closing force, so that the stroke-responsive valve 23 remains closed as far as no fluid pressure that can overcome the above valve closing force is applied from the master cylinder 1. On the other hand, in the device of FIG. 1, when fluid pressure is supplied from the master cylinder during automatic brake control, the solenoid valve 9 is opened. In this respect, the stroke-responsive valve 23 has practically the same function as the solenoid valve 9.

Which of the solenoid valve 9 and the stroke responsive valve 23 should be chosen may be determined taking into consideration the degree of freedom of spring design, component costs, ease of the entire layout, etc. But in an ordinary sense, the stroke-responsive valve would be more advantageous because it needs no driving circuit.

Numeral 24 indicates a cup seal which seals the outer periphery of a large-diameter portion of the stepped piston 11 when the piston moves toward the output chamber 14. When the stepped piston 11 is moving back toward the input chamber 12, the seal 24 yields, allowing the brake fluid in the adjusting chamber 13 to flow into the output chamber 14. That is, this seal 24 has both the function of the second check valve 17 and the O-ring 27 provided around the outer periphery of the large-diameter portion of the stepped piston in the arrangement of FIG. 1. Thus, this embodiment is structurally simpler.

Numeral 25 indicates a second relief valve provided between the input chamber 12 and the output chamber 14. This valve is useful in a situation where the pressure in the wheel brake 2 repeatedly increases and decreases in such a short period of time that the stepped piston 11 cannot return, with the fluid supply amplifier 10 activated and the pressure-responsive valve 18 closed. In such a situation, the stepped piston 11 may move to its stroke end near the output chamber 14 before the pressure-responsive valve 18 opens.

If this happens, fluid discharged from the pump 5 cannot flow to anywhere, so that the pressure in the fluid discharge circuit will rise abnormally. Also, in this situation, it is impossible to increase the wheel brake pressure, because no braking fluid is supplied to the wheel brake. The second relief valve 25 solves this problem by opening when the input fluid pressure P1 rises after the piston 11 has moved to the stroke end.

When the second relief valve 25 opens and the output pressure P2 rises to a predetermined level, the pressure-responsive valve 18 opens, allowing the stepped piston 11 to move back to its normal position on the same principle as with the device of FIG. 1. Needless to say, while the stepped piston 11 has not reached the stroke end, the pressure-responsive valve 18 has to open before does the second relief valve 25.

Numeral 26 is a third (additional) relief valve provided between the adjusting chamber 13 and the master cylinder 1 so that the stepped piston 11 can return more smoothly. By setting the valve opening pressure for the third relief valve 26 slightly lower than that for the first relief valve 8, the thrust for returning the stepped piston 11 will be greater than the counteracting thrust (at this time, P1=P2=fluid pressure in the adjusting chamber 13). When the fluid pressure in the adjusting chamber 13 exceeds the valve opening pressure for the third relief valve 26, brake fluid in the adjusting chamber 13 quickly returns through the relief valve 26 into the master cylinder 1. At this time, the entire fluid discharged from the pump 5 is used to push back the stepped piston 11, so that the piston returns a long distance. The piston is thus less likely to be moved to the stroke end. Once the piston 11 returns to the original position, the fluid discharged from the pump 5 is released through the first relief valve 8. As described above, the fluid released through the relief valve 8 may be preferentially returned into the fluid chamber 21a of the second reservoir 21. Similarly, the fluid released through the third relief valve 26 may also be preferentially returned into the fluid chamber 21a of the second reservoir 21.

This invention is not limited to the devices shown in FIGS. 1 and 3.

For example, while the stepped piston 11 of either of the embodiment is a one-piece member consisting of the large- and small-diameter portions, two separate pistons, one large and the other small in diameter, may be used instead. Also, the input chamber 12 and the adjusting chamber 13 may be provided where the adjusting chamber and the input chamber are arranged in the embodiments to use the input member 12 as the adjusting chamber and the adjusting member 13 as the input chamber.

As described above, according to this invention, the fluid supply amplifier amplifies the amount of fluid supplied to the wheel brake in the low-pressure region. In the high-pressure region, the pressure-responsive valve, provided parallel to the amplifier, opens, feeding fluid discharged from the pump directly into the wheel brake. Thus, it is possible to increase pressure quickly (with high response) in the low-pressure region without using a large-output motor, and to increase pressure to a high level in the high-pressure region.

In the low-pressure region, a load corresponding to the amplifying rate of fluid supplied is applied to the pump-driving motor, so that the difference in output in the low-pressure region and the high-output region diminishes. Thus, it is not necessary to use a large and bulky motor.

What is claimed is:

1. A brake fluid pressure control device having an automatic brake function comprising:

an antilock control means provided between a master cylinder and a wheel brake, said antilock control means comprising a wheel brake fluid pressure control valve for controlling the fluid pressure in the wheel brake, a first fluid reservoir for storing brake fluid discharged from the wheel brake through said control valve, and a pump for pumping and returning the fluid in said first fluid reservoir into a line connecting the master cylinder to said control valve, said brake fluid pressure control device further comprising a first valve means for connecting said master cylinder to an inlet port of said pump, a second valve means for checking fluid flow from said pump to said master cylinder, and a first relief valve for releasing brake fluid into said master cylinder when the fluid pressure in the line between said second valve means and said wheel brake fluid pressure control valve exceeds a predetermined value, said brake fluid pressure control device further comprises a normally open on-off valve provided between said master cylinder and said wheel brake fluid pressure control valve, and a fluid supply amplifier and a pressure-responsive valve provided parallel to each other between the discharge port of said pump and said wheel brake fluid pressure control valve, said fluid supply amplifier comprising an input chamber, an output chamber, an adjusting chamber, and a stepped piston having a first pressure-receiving surface facing said input chamber, a second pressure-receiving surface facing an adjusting chamber and receiving the pressure in the same direction as said first pressure-receiving surface, and a third pressure-receiving surface having an area equal to the sum of the areas of said first and second pressure-receiving surfaces and facing said output chamber, and a biasing means biasing said stepped piston toward said input chamber, said input chamber being connected to the discharge port of said pump, and said output chamber being connected to a line connecting said on-off valve to said wheel brake fluid pressure control valve, said brake fluid pressure control device further comprising a first check valve provided between said adjusting chamber and said master cylinder for allowing only fluid flow from said master cylinder toward said adjusting chamber, and a second check valve provided between said adjusting chamber and said output chamber for allowing only fluid flow from said adjusting chamber to said output chamber, said pressure-responsive valve receiving the fluid pressure from said output chamber in a valve opening direction and receiving the fluid pressure from said master cylinder and a spring force in a valve closing direction and adapted to open and connect the discharge port of said pump to said wheel brake fluid pressure control valve when the fluid pressure in said output chamber exceeds a predetermined value.

2. A brake fluid pressure control device having an automatic brake function as claimed in claim 1 further comprising a second relief valve provided between said input chamber and said output chamber for connecting said input chamber to said output chamber when the fluid pressure in said input chamber exceeds the fluid pressure in said output chamber by a predetermined value.

3. A brake fluid pressure control device having an automatic brake function as claimed in claim 2 wherein said on-off valve is a stroke-responsive valve actuated by said stepped piston and having a valve body and a valve seat and adapted to open with said stepped piston in at a stroke end near said input chamber and otherwise closed with said valve body in contact with said valve seat.

4. A brake fluid pressure control device having an automatic brake function as claimed in claim 2 further comprising a third relief valve for releasing brake fluid in said adjusting chamber into said master cylinder when the fluid pressure in said adjusting chamber exceeds the fluid pressure in said output chamber by a predetermined value.

5. A brake fluid pressure control device having an automatic brake function as claimed in claim 1 wherein said on-off valve is a stroke-responsive valve actuated by said stepped piston and having a valve body and a valve seat and adapted to open with said valve body separate from said valve seat when said stepped piston is at a stroke end near said input chamber and otherwise closed with said valve body in contact with said valve seat.

6. A brake fluid pressure control device having an automatic brake function as claimed in claim 3 further comprising an additional relief valve for releasing brake fluid in said adjusting chamber into said master cylinder when the fluid pressure in said adjusting chamber exceeds the fluid pressure in said output chamber by a predetermined value.

7. A brake fluid pressure control device having an automatic brake function as claimed in claim 1 further comprising an additional relief valve for releasing brake fluid in said adjusting chamber into said master cylinder when the fluid pressure in said adjusting chamber exceeds the fluid pressure in said output chamber by a predetermined value.

* * * * *